(12) United States Patent  (10) Patent No.: US 9,092,695 B1
Ogale  (45) Date of Patent: Jul. 28, 2015

(54) HIGH-ACCURACY REAL-TIME ROAD SIGN DETECTION FROM IMAGES

(71) Applicant: Google Inc., Mountain View, CA (US)

(72) Inventor: Abhijit S. Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 92 days.

(21) Appl. No.: 13/799,829

(22) Filed: Mar. 13, 2013

(51) Int. Cl.
G06K 9/00 (2006.01)
G06K 9/62 (2006.01)

(52) U.S. Cl.
CPC .......... *G06K 9/6202* (2013.01); *G06K 9/00791* (2013.01)

(58) Field of Classification Search
None
See application file for complete search history.

(56) References Cited

U.S. PATENT DOCUMENTS

| | | | |
|---|---|---|---|
| 5,220,508 A | 6/1993 | Ninomiya et al. | |
| 6,266,442 B1 * | 7/2001 | Laumeyer et al. | 382/190 |
| 7,058,206 B1 * | 6/2006 | Janssen et al. | 382/104 |
| 7,729,850 B1 * | 6/2010 | Kraft et al. | 701/423 |
| 8,212,878 B2 | 7/2012 | Shima et al. | |
| 8,233,670 B2 * | 7/2012 | Moed et al. | 382/113 |
| 2001/0036293 A1 * | 11/2001 | Laumeyer et al. | 382/104 |
| 2006/0212216 A1 * | 9/2006 | Kobayashi et al. | 701/207 |
| 2007/0081729 A1 * | 4/2007 | Ogawa | 382/209 |
| 2007/0221822 A1 * | 9/2007 | Stein et al. | 250/205 |
| 2009/0074249 A1 * | 3/2009 | Moed et al. | 382/104 |
| 2009/0109216 A1 * | 4/2009 | Uetabira | 345/419 |
| 2009/0169055 A1 * | 7/2009 | Ishikawa | 382/104 |
| 2009/0177379 A1 * | 7/2009 | Jones | 701/207 |
| 2010/0274469 A1 * | 10/2010 | Takahata et al. | 701/200 |
| 2014/0067187 A1 * | 3/2014 | Ferguson et al. | 701/28 |

FOREIGN PATENT DOCUMENTS

JP  2000293670 A  10/2000

* cited by examiner

*Primary Examiner* — Tahmina Ansari
(74) *Attorney, Agent, or Firm* — Lerner, David, Littenberg, Krumholz & Mentlik, LLP (57) ABSTRACT

Objects, such as road signs, may be detected in real-time using a camera or other image capture device. As images are received through the camera, candidate signs are first detected. The detection of candidate signs employs constant-time normalized cross correlation, including generation of intermediate images and integral images, and applying a template of concentric, different sized shapes over the integral images. From the pool of candidate signs, false positives may be separated out using shape classification to identify actual road signs.

17 Claims, 7 Drawing Sheets

HIGH-ACCURACY REAL-TIME ROAD SIGN DETECTION FROM IMAGES

BACKGROUND OF THE INVENTION

While techniques for detecting objects may exist, these techniques often lack accuracy, require significant processing time, or both. As such, these techniques are inadequate for applications that require fast, accurate object detection.

BRIEF SUMMARY OF THE INVENTION

One aspect of the disclosure provides a method of detecting objects, such as road signs or other objects encountered along a roadway. This method may include receiving images from an image capture device, detecting a plurality of candidate objects within the received images, performing shape classification on the plurality of candidate objects, and eliminating non-objects from the plurality of candidate objects. Detecting the candidate objects may more specifically include performing constant-time normalized cross-correlation between a template and the camera image, computing a score for objects identified in the camera image based on their fit within the template, and selecting the candidate objects based on the computed score. According to one example, performing constant-time normalized cross-correlation includes detecting areas of a given color within the received image by computing an intermediate image, building a first integral image from the intermediate image, and computing a second integral image which sums the squares of the intermediate image. The intermediate image may be computed by subtracting a maximum of a first and second color channels from a third color channel, the third color channel corresponding to the given color. However, in some instances, the intermediate image may be the original image.

Another aspect of the disclosure provides a system for detecting objects, including an image capture device adapted to continually receive images, a processor in communication with the image capture device, and a memory storing instructions executable by the processor. These instructions may perform a method of receiving images from the image capture device, detecting a plurality of candidate objects within the received images, performing shape classification on the plurality of candidate objects, and eliminating non-objects from the plurality of candidate objects. Detecting the candidate objects may include performing constant-time normalized cross-correlation between a template and the camera image, computing a score for objects identified in the camera image based on their fit within the template, and selecting the candidate objects based on the computed score. In some examples, the processor may further execute instructions for detecting areas of a given color within the received image by computing an intermediate image, the intermediate image being computed by subtracting a maximum of a first and second color channels from a third color channel, the third color channel corresponding to the given color. Further executable instructions may include building a first integral image from the intermediate image, wherein each pixel in a given coordinate position of the first integral image stores the sum of all pixels in lower coordinate positions in the intermediate image, and computing a second integral image which sums the squares of the intermediate image.

Yet another aspect of the disclosure provides a non-transitory computer readable medium storing information and instructions executable by a processor for performing a method of detecting objects. This method may include receiving images from an image capture device, detecting a plurality of candidate objects within the received images, performing shape classification on the plurality of candidate objects, and eliminating non-objects from the plurality of candidate objects. Detecting candidate objections further includes performing constant-time normalized cross-correlation between a template and the camera image, computing a score for objects identified in the camera image based on their fit within the template, and selecting the candidate objects based on the computed score.

DETAILED DESCRIPTION

The disclosure relates to detection of road signs in real-time using a camera. As images are received through the camera, candidate signs are first detected. From the pool of candidate signs, false positives may be separated out to identify actual road signs. Using such a two-stage process reduces computer processing, thereby enabling the images to be detected in real-time. One application may be in an autonomous vehicle to detect road construction signs. In this regard, a driver can be prompted to take control of the car in construction zones.

The candidate signs may be identified by scanning the camera image for a particular color and shape. For example, to detect road construction signs, which are typically orange, the yellow-orange-red areas of the images are identified and used to compute an intermediate image. The intermediate image is then used to compute an integral image, which is an image that sums a range of pixels. A template, including shapes of various sizes (e.g., small, medium, and large concentric rectangles), is designed, where each size rectangle has a different weight (e.g., +1 for the smallest rectangle, 0 for the medium rectangle, −1 for the largest rectangle). Normalized cross correlation of the template and the camera image is performed and used to compute a score (e.g., from 0 to 1). For example, a sliding window may be moved over the image in different positions to find the orange rectangle road signs. This sliding window may be run at different positions and scales (to find large and small signs). A sign that mostly fits within the smallest (+1 weight) rectangle will receive a higher score, and thus be selected as a candidate road sign. However, the template allows room for error by its design, and enables detection of signs that are damaged, misshapen, viewed at an angle, or partially obstructed, and therefore do not fit perfectly within any one rectangle of the template. Detection of diamond shaped signs is performed using the same technique as for a rectangle sign, except the integral images are rotated 45 degrees.

To eliminate false positives from the candidate pool, classification is performed. Features are portions of the camera image that may be identified and collectively used to recognize a sign. For example, features may be corners or edges of a sign, color, text, texture, a pole mounted below the sign, a tree or sky in the background behind a sign, etc. "Weak classifiers" may be trained on these individual features which convey the likelihood of the existence of a sign. Initially, a training database may be built using images known to include signs and images of objects that are known not to be signs. This training database may be used to teach a learning algorithm what should be identified as a sign in a camera image and what should not be. The algorithm utilizes Adaboost, which takes a number of weak classifiers into consideration to increase precision, thereby producing a "strong" classifier. For example, rather than just using one weak classifier (e.g., a sign edge) to determine whether an object is a sign, multiple classifiers (e.g., edges, color, text, background) may be used together to ensure that the object is a sign. Moreover, Asymmetric Adaboost may be used, where different weights are assigned to different examples (e.g., to assign greater penalties to identifying an actual sign as a non-sign than to identifying a false positive). Even further, a technique called dropout may be employed within Adaboost, where redundancy is added to increase robustness of the algorithm. For example, when several classifiers have been identified, the presence of one or more of those classifiers may be ignored when selecting the next classifier. Thus, for example, if the algorithm detects a rectangular edge, an orange color, and the text "Slow," the algorithm may ignore the fact that the edge has been detected when selecting the next classifier (e.g., the pole under the sign). This makes the algorithm more robust to missing or hidden features, and improves generalization. Another form of 'dropout', which ignores a fraction of the training examples while selecting the next classifier, may also be used, possibly in conjunction with the 'dropout' of some of the previously selected classifiers.

Figure 1:
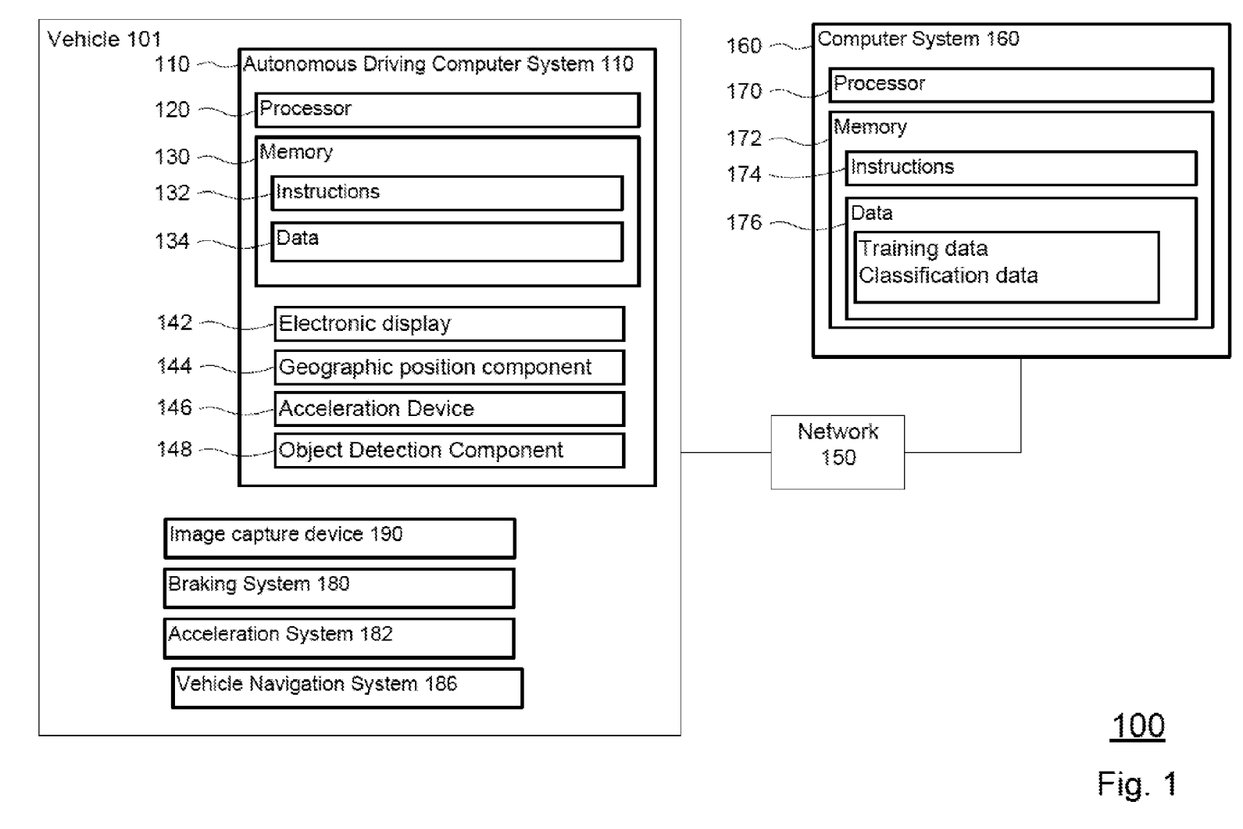
FIG. 1 is a block diagram of a system according to aspects of the disclosure.

FIG. 1 illustrates an autonomous driving system 100, which includes a vehicle 101 with various components and a computer system 160 communicatively coupled to the vehicle 101 through, for example, a network 150. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

Computer 110 may include all of the components normally used in connection with a computer such as a central processing unit (CPU), graphics processing unit (GPU), memory (e.g., RAM and internal hard drives) storing data 134 and instructions such as a web browser, an electronic display 142 (e.g., a monitor having a screen, a small LCD touch-screen or any other electrical device that is operable to display information), and user input (e.g., a mouse, keyboard, touch-screen and/or microphone).

Computer 110 may also include a geographic position component 144 to determine the geographic location of the device. For example, computer 110 may include a GPS receiver to determine the device's latitude, longitude and/or altitude position. Other location systems such as laser-based localization systems, inertial-aided GPS, or camera-based localization may also be used.

Computer 110 may also include other features, such as an accelerometer, gyroscope or other acceleration device 146 to determine the direction in which the device is oriented. By way of example only, the acceleration device may determine its pitch, yaw or roll (or changes thereto) relative to the direction of gravity or a plane perpendicular thereto. In that regard, it will be understood that a computer's provision of location and orientation data as set forth herein may be provided automatically to the user, other computers of the network, or both.

Computer 110 may also include an object detection component 148 to detect and identify objects such as traffic signals, signs, pedestrians, etc. The detection system may include lasers, sonar, radar, cameras or any other such detection methods. For example, the object detector may communicate with image capture device 190 to identify road signs, including text or pictorial messages included on the signs. In use, computer 110 may use this information to instruct the braking system of the vehicle to apply the brakes.

Computer 110 may send and receive information from the various systems of vehicle 101, for example the breaking 180, acceleration 182, signaling 184, and navigation 186 systems in order to control the movement, speed, etc. of vehicle 101.

In one example, computer 110 may be an autonomous driving computing system capable of communicating with a remote server or other computer, such as computer 160. Computer 160 may be configured similarly to computer 110, for example, including a processor 170, memory 172, instructions 174, and data 176. Data 176 may include various types of information used by computer 160. For example, training and classification data may be stored for use by the processor 170 in training an algorithm for detecting objects, such as road signs. The trained algorithm may be provided to the computer 110 for use by the vehicle 101 in real-time detection of road signs. For example, the trained algorithm may be downloaded by the computer 110 through the network 150. As another example, the algorithm may be stored on a computer-readable medium and transferred to the computer 110, or the algorithm may be communicated to the computer 110 in any other way.

It will be understood that although various systems and computer 110 are shown within vehicle 101, these elements may be external to vehicle 101 or physically separated by large distances. Similarly, while the processor 170 and memory 172 are both shown as being within the computer 160, these components may reside externally of a computer housing.

Figure 2:
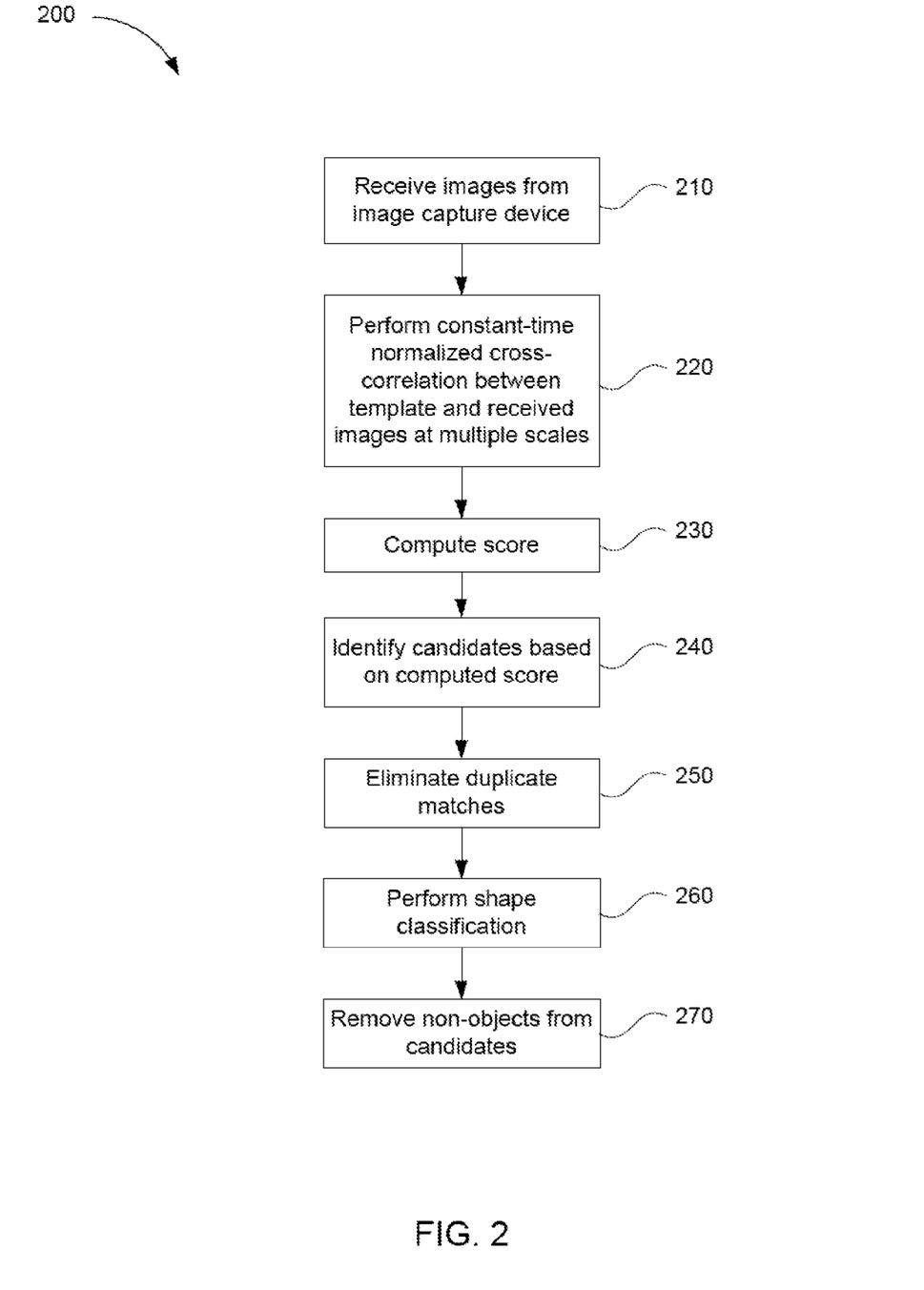
FIG. 2 is a flow diagram illustrating a method for detecting objects in real-time according to aspects of the disclosure.

FIG. 2 illustrates a method 200 for detecting objects in real time. In one example, this method 200 may be continually executed by the autonomous driving computer system 110 to identify traffic signs. The autonomous driving system may adapt the driving style of the car in response to the detected sign, such as by slowing down.

In block 210, an image is received from an image capture device. The images may be still images, frames from video data, or the like.

In block 220, constant time normalized cross correlation is performed between a template and the image. The templates may include a plurality of shapes, and different templates may be used for detecting signs of different shapes. The shapes may be concentric. The templates are described in further detail with respect to FIGS. 3-5.

The constant-time normalized cross correlation enables detection of candidate signs quickly without missing any signs. For example, the normalized cross-correlation between the template and an image patch is performed using an integral image, and the time is independent of the size of the image patch. According to one example, the normalized cross correlation may be based on a color and shape of a sign or other object to be detected. For example, to detect construction signs, the yellow-orange-red areas of the received image may be detected. To do this, the original image I(x,y,c) (where x,y represent the pixel location, and c represents the color channel (c=R, G, or B)) from the camera is used to compute an intermediate image R(x,y) by subtracting the maximum of the blue and green channels from the red channel. Accordingly, the intermediate image may be represented using the following equation:

$$R(x,y)=I(x,y,R)-\max(I(x,y,G),I(x,y,B)).$$

R(x,y) represents the "redness" across the image. To detect rectangle signs, an "integral image" S(x,y) is built from the image R(x,y) as follows:

$$S(x,y)=R(x,y)+S(x-1,y)+S(x,y-1)-S(x-1,y-1)$$

According to some examples, the integral image may be built on the original image. For example, if the source image is monochrome, or if the sign to be detected is not-colored (white/black/gray), then the original image may be used as the intermediate image.

Each pixel S(x,y) of the integral image stores the sum of all pixels in R(x',y') for all $0<=x'<=x$, $0<=y'<=y$. For example, a pixel in the middle of the integral image may store all pixels to the left of that position in the intermediate image, and all pixels below that position in the intermediate image. Such an integral image enables fast computation of the sum of the "redness" in any rectangle R(x0, y0, x1, y1) within the image as follows:

$$\text{RectSum}(R(x0,y0,x1,y1))=S(x1,y1)-S(x0-1,y1)-S(x1,y0-1)+S(x0-1,y0-1)$$

Additionally, the integral image Ssq(x,y), which sums the squares of the redness image $(R(x,y))^2$, is computed. Candidate rectangle signs may be identified using S(x,y) and Ssq(x,y) together.

The template may be applied to find yellow-orange-red rectangles with an aspect ratio of approximately 2:1. Each concentric shape of the template may have a different value, such as +1, 0 and -1. The zero region allows some invariance to small translation, scaling, and rotation. The template may be applied across a range of scales and every possible location to detect signs of various sizes at various positions in the image. In one example, the matching is not sensitive to contrast, thus allowing for the detection of really dark signs at night as well. We use thresholds on the standard deviation and mean to reduce detection of very high noise areas.

A normalized cross correlation of the template with the image in constant time using the integral images S(x,y) and Ssq(x,y) is used to compute a score from 0 to 1 (block 230). If the score is above a threshold t, then the area within the template is marked as a candidate sign (block 240).

In block 250, duplicate matches may be eliminated. One technique for eliminating duplicate matches includes using non-maximum suppression. For example, candidate matches which are close to a strong candidate match and have similar size may be removed.

Some objects other than road signs may be included in the identification of candidate signs. Accordingly, false positives may be removed from the set of candidate signs. In block 260, shape classification is performed. A multi-stage cascade of classifiers is trained using a database of positive and negative examples, such as objects known to be signs and objects known to not be signs. Using a cascade of classifiers gradually increases precision across the stages.

To train each stage, one or more techniques may be used. For example, one technique includes implementing a learning algorithm, such that distinguishing signs from non-signs within the candidate signs is learned. A validation set may stop the training early if a learning goal is reached.

Another technique includes selecting a small number of weak classifiers, and using those classifiers in combination. For example, classifiers such as color, edges, text, mounting on poles, background, or the like may be selected as classifiers.

Another technique includes asymmetric boosting, which weights positive and negative examples differently to maintain high recall. For example, the importance of missing a sign may be higher than the importance of falsely identifying a non-sign as a sign. Accordingly, missing a sign may be assigned a greater weight.

According to one example, a "dropout" technique may be used, where noise or redundancy is added during training. For example, the presence of one or more selected classifiers may be ignored when selecting the next classifier. Thus, in an example where edges and text in an object are detected, the presence of the text may be ignored when determining whether the object is mounted on a pole, thereby increasing the range of examples that would return a positive match. Another 'dropout' technique, which ignores a fraction of the training examples while selecting the next classifier, may also be used, possibly in conjunction with the dropout of some of the previously selected classifiers.

In block 270, non-objects may be removed from the candidates based on the classification. The remaining candidates may thus be determined to be actual road signs.

Figure 3:
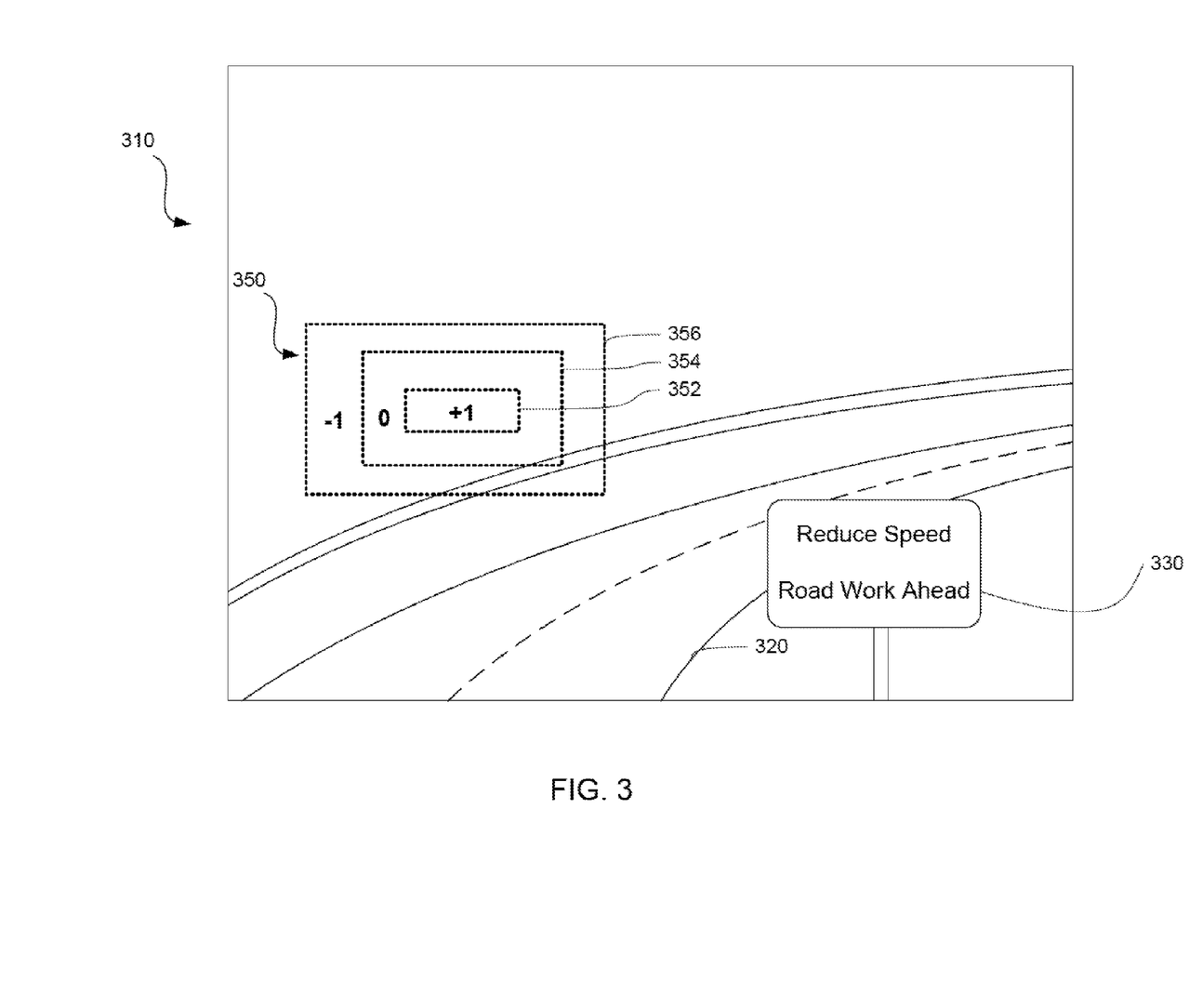
FIG. 3 illustrates an example of a template applied to an image according to aspects of the disclosure.

FIG. 3 illustrates an example of a template 350 for detecting a rectangular road sign 330 in an image 310. The template 350 includes several concentric rectangles 352, 354, 356. Each of these rectangles may be weighted differently. For example, the innermost rectangle 352 may correspond to a weight of +1, while the middle rectangle 354 corresponds to a weight of 0 and the outermost rectangle 356 corresponds to a weight of −1. As the template 350 is scanned over the image of roadway 320 at different scales, the computer 110 may detect that the road sign 330 fits within one or more of the rectangles of the templates 350. Depending on which rectangles the sign 330 fits in, a score is assigned to the sign 330. For example, if the sign fits within the rectangle 352 and partially extends into the rectangle 354, it will be assigned a score closer to 1. If the score assigned to the detected object meets or exceeds a predetermined threshold, the object may be identified as a candidate sign. The threshold may be learned from training data.

Figure 4:
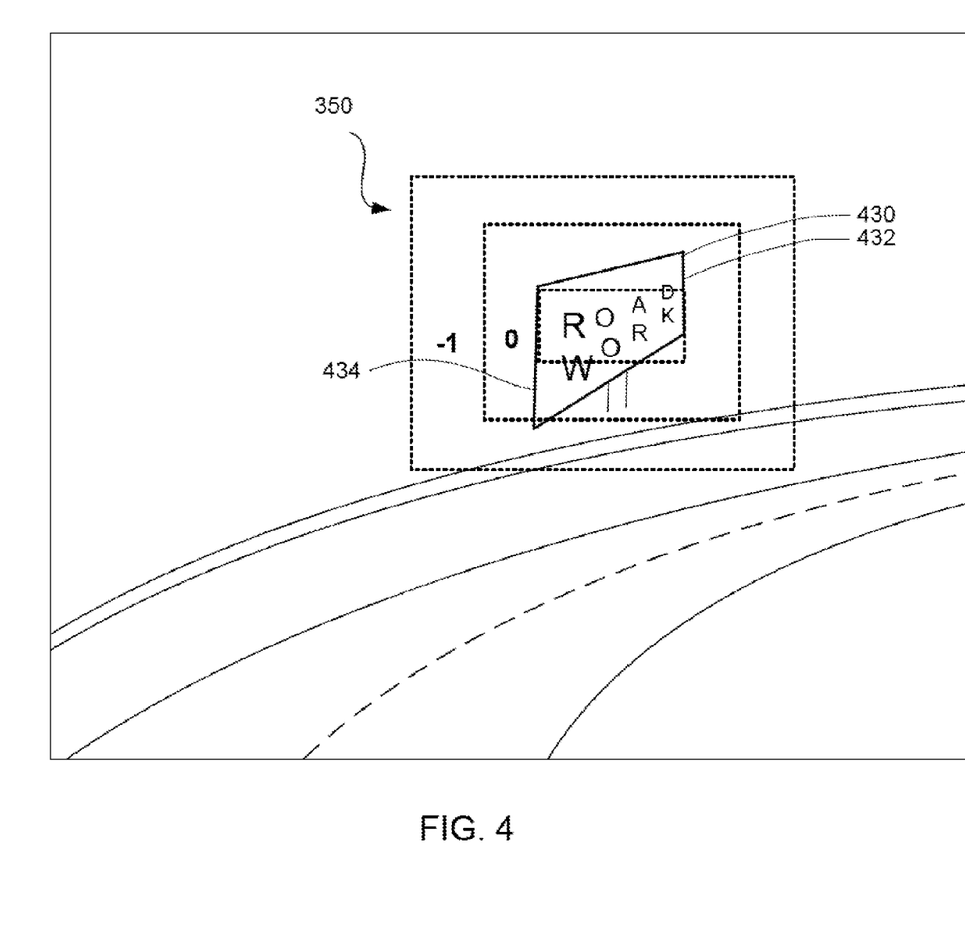
FIG. 4 illustrates an example of the template of FIG. 3 in relation to a detected object according to aspects of the disclosure.

The zero region in the design of the template 350 enables detection of signs that are damaged, obstructed, angled, or otherwise irregular in appearance in an image. For example, FIG. 4 illustrates the template 350 in relation to a road sign 430, which is angled with respect to the image capture device, and which thus appears to be smaller at a first edge 432 than at a second edge 434. Although the sign 430 appears to have a non-rectangular shape, it will nevertheless be identified as a candidate image because it fits within the template 350.

Figure 5:
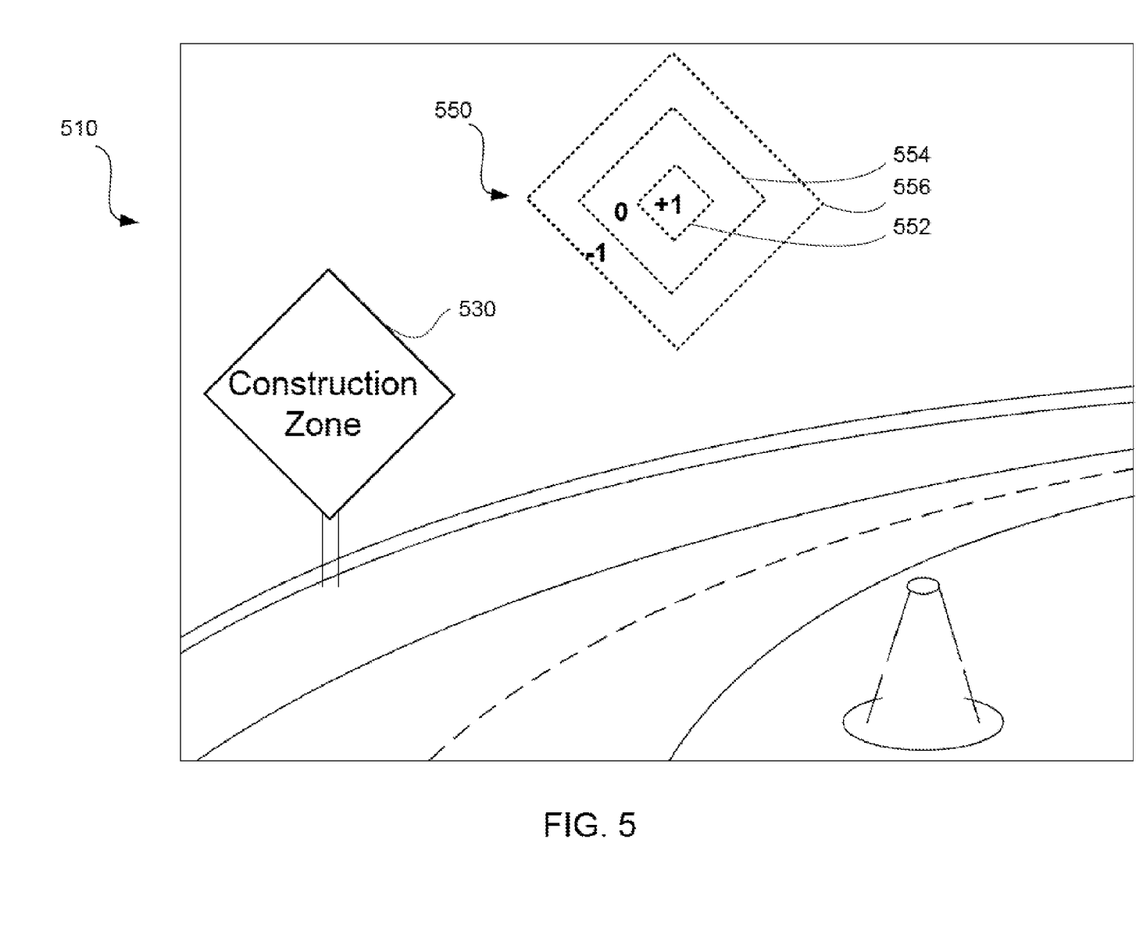
FIG. 5 illustrates another example of a template applied to an image according to aspects of the disclosure.

FIG. 5 illustrates an example of a template 550 for detecting a diamond shape road sign 530 in an image 510. Similar to the template 350, the template 550 may include several concentric shapes 552, 555, 556, each being assigned a different weight. These weights may be pre-normalization weights, and the template may include zero-mean and unit standard deviation at each scale before applying it. The zero region allows some invariance to small deformation, translation, scaling, and rotation.

Figure 6:
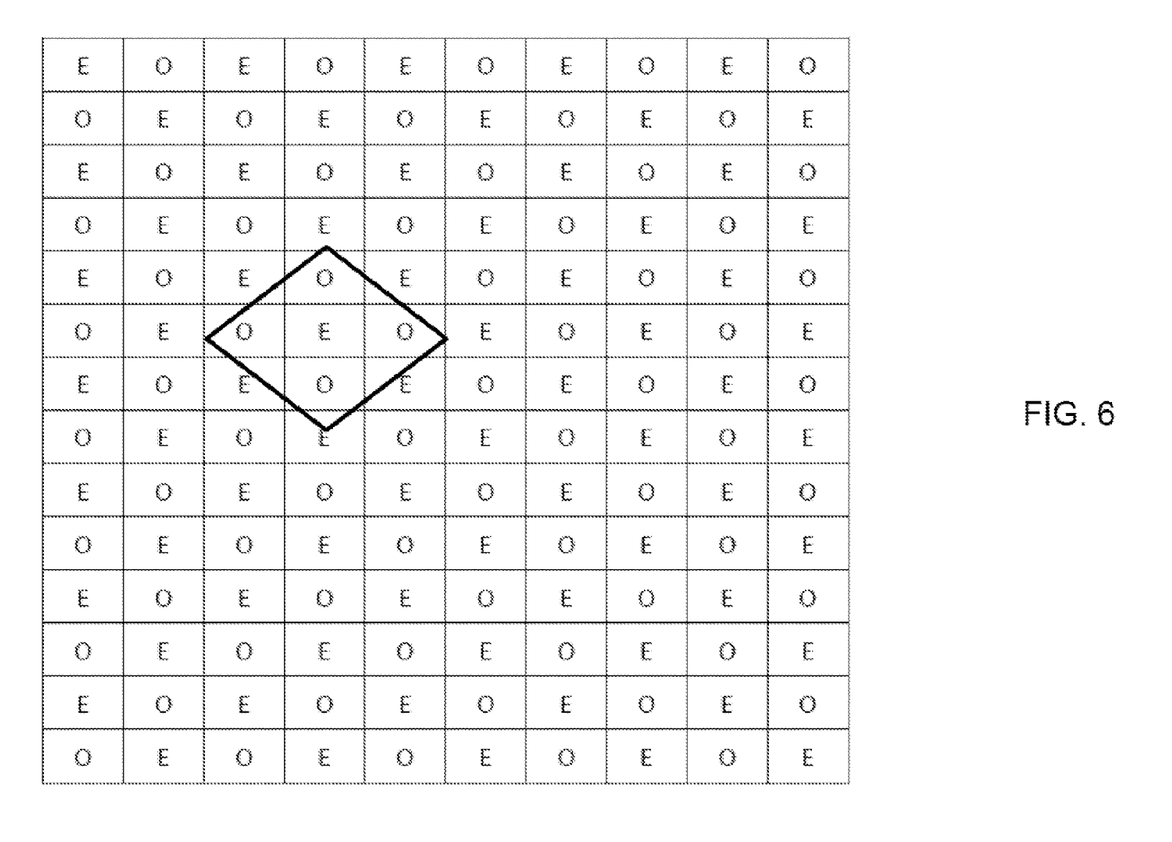
FIG. 6 illustrates an example of an interleaved integral image according to aspects of the disclosure.

For detecting diamond signs, the integral images built may be rotated by 45 degrees. So, within each integral image, two independent interleaved integral images are computed. For example, one integral image includes pixels with even (x+y) and the other includes pixels with odd (x+y). FIG. 6 illustrates an example of an interleaved integral image, with odd (O) and even (E) grids. The odd and even grids are independent and do not interact.

The formula for this "diagonal" integral image is:

$$S(x,y)=o(x,y)+S(x-1,y-1)+S(x+1,y-1)-S(x,y-2),$$

where S is the integral image, and o is the original image. Such "diagonal" integral images $S(x,y)$ and $Ssq(x,y)$ built over $R(x,y)$ enable fast detection of diamond-shaped signs using fast normalized cross-correlation.

Figure 7:
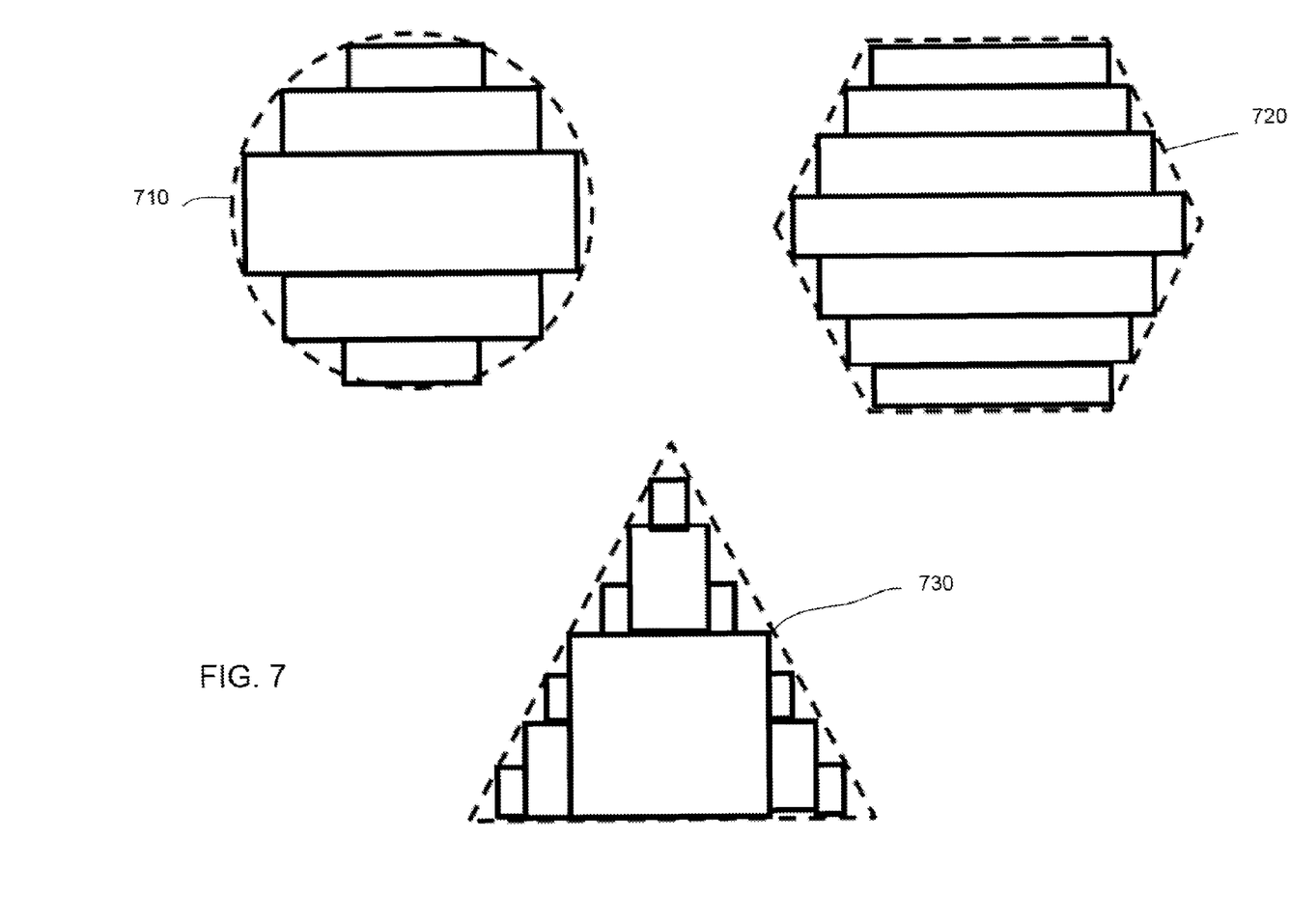
FIG. 7 illustrates examples of different shaped templates using a number of rectangles according to aspects of the disclosure.

While specific examples of rectangular and diamond templates 350, 550 are provided above, the templates used in object detection may be any shape, including circular, triangular, octagonal, or the like. Moreover, while three shapes are used in each example, the template may include any number of shapes positioned in relation to each other, and not necessarily concentric. Furthermore, different shapes can be approximated by a collection of rectangles as shown in FIG. 7. For example, circular template 710 may include a number of rectangles sized and positioned to approximate the shape of a circle. Each of these rectangles may be weighted differently or the same. Moreover, each of these rectangles may include one or more subrectangles (not shown) with different weights. Similarly, hexagonal template 720 and triangle template 730 may each include a number of rectangles sized and positioned to approximate their respective shapes. Numerous other shaped templates can be generated using this technique, such as octagonal, oval, etc.

Because the present disclosure provides for fast and accurate detection of objects, such as road signs, such information may be used in applications such as autonomous driving, where fast and accurate perception of encountered objects is critical. In one example, the autonomous vehicle may react to the detection of particular road signs. For example, if the detected sign is a construction zone sign, the vehicle may prompt the user to take control of the car. As another example, if the detected sign is a school crossing sign, the vehicle may reduce its speed.

As these and other variations and combinations of the features discussed above can be utilized without departing from the subject matter as defined by the claims, the foregoing description of exemplary embodiments should be taken by way of illustration rather than by way of limitation. For example, while the subject matter has been described herein with respect to detecting road signs encountered by an autonomous vehicle, the techniques disclosed may be used in any of a variety of types of devices to detect any type of object for any purpose. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of detecting objects, comprising:
   receiving images from an image capture device;
   detecting a plurality of candidate objects within the received images, comprising:
      performing constant-time normalized cross-correlation between a template and the camera image, the constant-time normalized cross-correlation comprising detecting areas of a given color within the received image by computing an intermediate image; building a first integral image from the intermediate image; and computing a second integral image which sums the squares of the intermediate image;
      computing a score for objects identified in the camera image based on their fit within the template; and
      selecting the candidate objects based on the computed score;
   performing shape classification on the plurality of candidate objects; and
   eliminating non-objects from the plurality of candidate objects.

2. The method of claim 1, wherein the intermediate image is computed by subtracting a maximum of a first and second color channels from a third color channel, the third color channel corresponding to the given color.

3. The method of claim 1, wherein each pixel in a given coordinate position of the first integral image stores the sum of all pixels in lower coordinate positions in the intermediate image.

4. The method of claim 1, wherein the normalized cross correlation comprises applying the template across a range of scales and locations in the received image.

5. The method of claim 1, wherein performing shape classification comprises training a multi-stage cascade of classifiers using a database of known objects and known non-objects as examples.

6. The method of claim 1, wherein performing shape classification comprises selecting a number of classifiers, and using those classifiers in combination.

7. The method of claim 1, wherein performing shape classification comprises weighting known objects and known non-objects differently.

8. The method of claim 6, wherein performing shape classification comprises ignoring a presence of one or more selected classifiers when selecting a next classifier.

9. The method of claim 1, further comprising adjusting the operation of an autonomous vehicle in response to detection of the object.

10. A system for detecting objects, comprising:
    an image capture device adapted to continually receive images;
    a processor in communication with the image capture device;
    a memory storing instructions executable by the processor, the instructions for performing a method of:
        receiving images from the image capture device;
        detecting a plurality of candidate objects within the received images, comprising:
            performing constant-time normalized cross-correlation between a template and the camera image, the constant-time normalized cross-correlation comprising detecting areas of a given color within the received image by computing an intermediate image; building a first integral image from the intermediate image; and computing a second integral image which sums the squares of the intermediate image;
            computing a score for objects identified in the camera image based on their fit within the template; and
            selecting the candidate objects based on the computed score;
        performing shape classification on the plurality of candidate objects; and
        eliminating non-objects from the plurality of candidate objects.

11. The system of claim 10, wherein the template comprises a plurality of concentric shapes of different sizes.

12. The system of claim 10, wherein:
    the template comprises a plurality of concentric diamond shapes; and
    each integral image includes two independent interleaved integral images.

13. The system of claim 11, wherein the normalized cross correlation comprises applying the template across a range of scales and locations in the received image.

14. The system of claim 10, wherein the memory further stores training data used for training a multi-stage cascade of classifiers.

15. The system of claim 10, wherein the shape classification comprises at least one of:
    selecting a number of classifiers, and using those classifiers in combination;
    weighting known objects and known non-objects differently; and
    ignoring a presence of one or more selected classifiers when selecting a next classifier.

16. The system of claim 10, further comprising an autonomous vehicle, wherein the processor is programmed to adjust the operation of an autonomous vehicle in response to detection of the object.

17. A non-transitory computer readable medium storing information and instructions executable by a processor for performing a method of detecting objects, comprising:
    receiving images from an image capture device;
    detecting a plurality of candidate objects within the received images, comprising:
        performing constant-time normalized cross-correlation between a template and the camera image, the constant-time normalized cross-correlation comprising detecting areas of a given color within the received image by computing an intermediate image; building a first integral image from the intermediate image; and computing a second integral image which sums the squares of the intermediate image;
        computing a score for objects identified in the camera image based on their fit within the template; and
        selecting the candidate objects based on the computed score;
    performing shape classification on the plurality of candidate objects; and
    eliminating non-objects from the plurality of candidate objects.

* * * * *